Patented May 17, 1927.

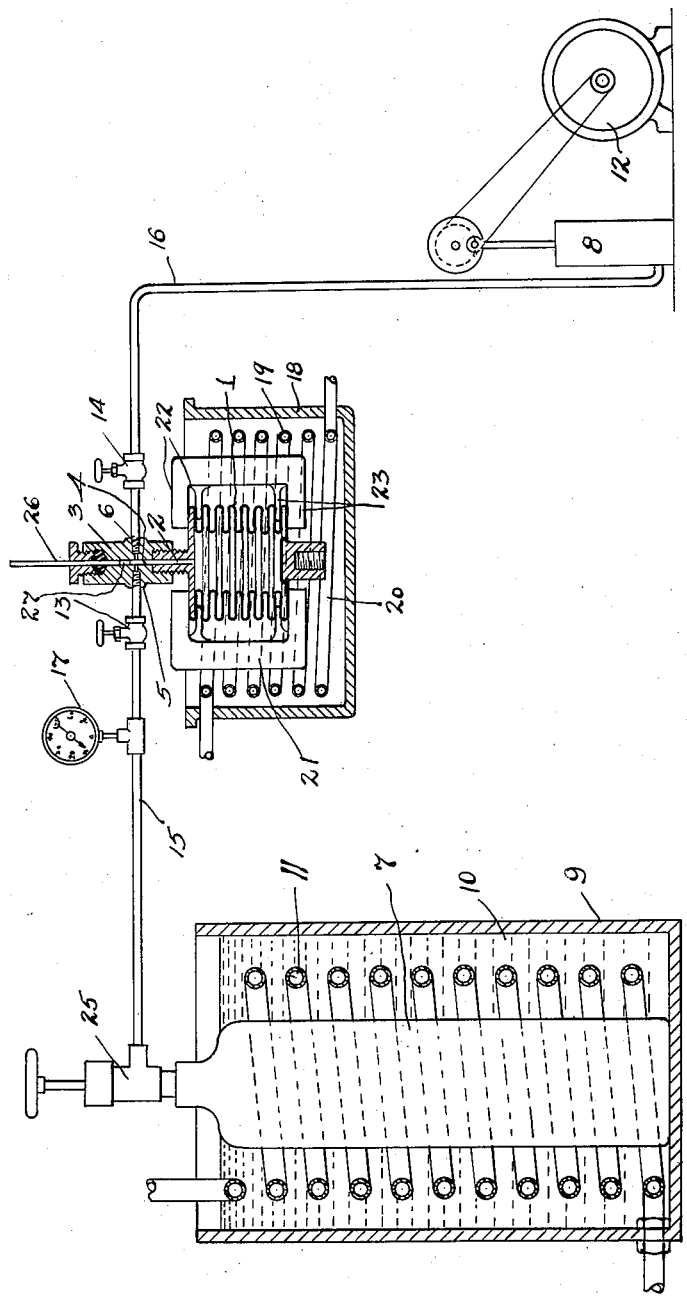

1,629,174

UNITED STATES PATENT OFFICE.

HAL T. PATTON, OF CLEVELAND, OHIO, ASSIGNOR TO THE BISHOP & BABCOCK COMPANY, OF CLEVELAND, OHIO, A CORPORATION OF OHIO.

METHOD OF AND APPARATUS FOR CHARGING HOLLOW EXPANSIBLE ELEMENTS.

Application filed November 7, 1922. Serial No. 599,614.

The present invention relates to a new and improved method of, and apparatus for, charging volatile liquids into hollow expansible elements for use as thermostats, and is particularly directed to the charging of corrugated metal tubes or bellows. To the accomplishment of the foregoing and related ends, said invention, then, consists of the means hereinafter fully described and particularly pointed out in the claims.

The annexed drawing and the following specification set forth in detail certain means and one mode of carrying out the invention, such disclosed means and mode illustrating, however, but one of various ways in which the principle of the invention may be used.

In said annexed drawing:—

The single figure there appearing is a diagrammatic view of one form of my improved apparatus which may be used to carry out my method.

The filling of expansible elements, such as bellows and the like, as now produced is in general extremely inaccurate, the filling being carried on at varying temperatures, varying pressure and the amounts of volatile liquid used varying in different bellows. The purpose of the present invention is the provision of a method (and a simple apparatus) for uniformly charging a given amount of the desired liquid under constant temperature and pressure conditions.

Means for accurately charging thermostats operating by saturated vapor tension is highly desirable, especially for thermostats used in connection with refrigeration units or systems for the reason that during shipment, or at such times as the units or systems are inoperative, the thermostat is often subjected to temperatures far in excess of those for which it is designed to operate. The same is true of thermostats designed to operate in the higher temperatures, as, for instance, in steam traps, hot-water thermostats and the like, due to varying steam pressures, etc.

The present system discloses a method and apparatus for charging thermostats in such a manner that at normal operating temperatures the thermostat operates by the tension of a saturated vapor, while at all temperatures above normal operating temperatures the volatile liquid is entirely vaporized and roughly follows the law of expansion of gases.

The term "saturated vapor" is used in the sense of its ordinary definition, i. e., a vapor in the presence of its own liquid. Now, since the pressure of a saturated vapor increases much more rapidly per degree temperature rise, than does a gas, it is highly desirable to protect the expansible vessel from the excessive pressure of a saturated vapor at the higher temperatures, especially when liquids of low boiling temperatures are employed.

In the figure is shown a hollow expansible metal element 1 having a single port or opening 2. This element or bellows is removably connected to a charging plug 3 provided with a passage 4 connecting to the port 2 in the bellows, and with ports 5 and 6 leading respectively to a tank or reservoir 7 and a vacuum pump 8. The reservoir 7 is mounted in a chamber 9 filled with liquid 10, through which extends a heating or casting coil 11 which may be employed to maintain said tank and its contents at a desired temperature. The vacuum pump may be operated from any suitable source of power, such as a motor 12, and operates to produce a high degree of vacuum in the bellows prior to the charging.

The tank 7 contains the desired volatile liquid. Valves 13 and 14 are mounted in the conduits 15 and 16 leading to the ports 5 and 6, respectively, and to the tank 7 and pump 8, while a pressure gauge 17 is also disposed in the conduit 15. The bellows is carried in a chamber 18 similar to the chamber 9, and this chamber is also equipped with a heating or casting coil 19 for maintaining the liquid 20 in such chamber, and also the bellows, at a desired temperature while the bellows is maintained in the desired normal condition of extension at the temperature at which it is designed to operate by means of a bracket or clamp 21 having lugs 22 and 23 eng..ging on either side of each end of the bellows.

The charging operation is as follows:— The bellows is first mounted in the clamp 21 and the chamber 18 brought to a temperature slightly in excess of the desired operating volatilization temperature of the liquid to be charged into the bellows. It should be noted that volatilization is a function of pressure at any definite temperature and that the purpose of maintaining the bellows at a slightly increased temperature is to prevent condensation within the bellows, which condensation would result in an excess of the liquid and defeat the object of the invention, viz, to have all of the liquid vaporized at the highest operating point. The temperature of the bellows should be only slightly higher than the vaporizing temperature for the normal pressure, otherwise the liquid will vaporize on entering the bellows and result in a decrease of the liquid. If the final bellows is to operate at 40° F., that is, expand at that temperature, then the chamber 21 may be maintained at, say, 41° F. during the charging operation. The valve 13 is now closed and the valve 14 opened. The pump 8 is operated to produce a high vacuum in the bellows. The valve 14 is then closed to seal this vacuum and the valve 13 is opened to allow vapor from the tank 7 to fill the bellows. The valve 25 permits sealing of the tank 7 until the desired temperature of the liquid therein is attained, after which the valve 25 is opened and maintained in that condition. The tank 7 is maintained at the same temperature as the desired operating or volatilization temperature in the bellows, that is 40° F. When the gauge shows the desired pressure the valve 13 is closed, and the bellows sealed by driving the rod 26 against the pin 27 to force the latter into the port 2 or by soldering this port closed, or in any other suitable manner.

Pressure before sealing will be determined by the temperature only. Pressure to do the work required will be determined by selecting the proper liquid, one whose vapor tension is great enough at the working temperature.

The advantages of my method are first an absolutely accurate and uniform charging. An even more important advantage is that the volatile liquid charged into the bellows is so measured in amount and charged under such conditions that at maximum operating temperatures and all lower temperatures it is a saturated vapor, and above such maximum operating temperature the charge is in a state of superheated vapor. The result is a rapid expansion exactly at the desired temperature instead of an inaccurate and not always rapid expansion, as is the case with bellows charged in the usual manner.

Other modes of applying the principle of my invention may be employed instead of the one explained, change being made as regards the means and the steps herein disclosed, provided those stated by any of the following claims or their equivalents be employed.

I therefore particularly point out and distinctly claim as my invention:—

1. In a method of charging a hollow expansible element with a volatile liquid adapted to volatilize at a given temperature, the steps which consist in maintaining said element in its normal condition of extension and at a temperature slightly above the condensation temperature at the existing pressure of the liquid to be charged, exhausting the contents of said element to produce a high vacuum therein, and then filling said element with vapor of the desired volatile liquid.

2. In a method of charging a hollow expansible element with a volatile liquid adapted to volatilize at a given temperature, the steps which consist in maintaining said element in its normal condition of extension and at a temperature slightly above the condensation temperature at the existing pressure of the liquid to be charged, exhausting the contents of said element to produce a high vacuum therein and then filling said element with vapor of the desired volatile liquid by connecting said element with a confined body of said volatile liquid maintained at a lower temperature than that of said element during the filling operation.

3. In a method of charging a hollow expansible element with a volatile liquid adapted to volatilize at a given temperature, the steps which consist in maintaining said element in its normal condition of extension and at a temperature slightly above the condensation temperature at the existing pressure of the liquid to be charged, exhausting the contents of said element to produce a high vacuum therein, filling said element with vapor of the desired volatile liquid by connecting said element to a confined body of said liquid, maintaining said body of liquid at the desired operating volatilization temperature thereof, and then sealing said element against the escape of such vapor.

4. In apparatus of the character described, the combination of means adapted to engage a hollow expansible element having a single opening to maintain the same in its normal condition of extension, means attachable to such opening in said element to produce a vacuum therein, a reservoir also attachable to such opening, means adapted to maintain said reservoir at a predetermined temperature, and means for sealing the opening of said element under the above conditions.

5. In apparatus of the character described scribed, the combination of means adapted to engage a hollow expansible element having a single opening to maintain the same in its normal condition of extension, a charging plug attachable to said opening, said plug having a longitudinal opening therethrough, a sealing pin carried in said plug opening adapted to fit said element opening, and means projecting exteriorly from said plug for driving said pin into said element opening.

Signed by me, this 4th day of November, 1922.

HAL T. PATTON.